United States Patent
Popp et al.

(10) Patent No.: US 7,456,750 B2
(45) Date of Patent: Nov. 25, 2008

(54) FIRE SUPPRESSION AND INDICATOR SYSTEM AND FIRE DETECTION DEVICE

(75) Inventors: James B. Popp, Olive Branch, MS (US); Arthur J. Benjamin, Germantown, TN (US)

(73) Assignee: Federal Express Corporation, Memphis, TN (US)

( * ) Notice: Subject to any disclaimer, the term of this patent is extended or adjusted under 35 U.S.C. 154(b) by 169 days.

(21) Appl. No.: 09/837,228

(22) Filed: Apr. 19, 2001

(65) Prior Publication Data

US 2001/0054964 A1 Dec. 27, 2001

Related U.S. Application Data

(60) Provisional application No. 60/198,319, filed on Apr. 19, 2000.

(51) Int. Cl.
*G08B 17/00* (2006.01)
*G08B 17/12* (2006.01)
*G08B 17/10* (2006.01)
*G08B 1/00* (2006.01)
*A62C 37/10* (2006.01)

(52) U.S. Cl. .................. 340/584; 340/600; 340/628; 340/531; 269/61

(58) Field of Classification Search .............. 340/584, 340/581, 577, 589, 622, 587, 600, 501, 628–630, 340/539, 539.1, 531; 169/56–62
See application file for complete search history.

(56) References Cited

U.S. PATENT DOCUMENTS

| | | | | |
|---|---|---|---|---|
| 3,713,491 A | * | 1/1973 | Grabowski et al. ............ | 169/61 |
| 3,799,271 A | | 3/1974 | Mitchell et al. | |
| 3,848,231 A | * | 11/1974 | Wootton ..................... | 340/524 |
| 3,909,814 A | * | 9/1975 | Eguchi ....................... | 337/42 |

(Continued)

FOREIGN PATENT DOCUMENTS

| WO | WO 93/12839 | 7/1993 |
|---|---|---|
| WO | WO 03/072200 A1 | 9/2003 |

*Primary Examiner*—Benjamin C Lee
(74) *Attorney, Agent, or Firm*—Finnegan, Henderson, Farabow, Garrett & Dunner, LLP

(57) ABSTRACT

A system for detecting and suppressing a fire condition in a storage unit. The system comprises a transmitter associated with the storage unit and configured to transmit a first signal upon detection of the fire condition, at least one receiver configured to detect the first signal and configured to provide a second signal indicating detection of the fire condition, and a fire suppression device configured to discharge a fire suppressant material into the storage unit upon detection of the fire condition. There may also be a plurality of storage units, a plurality of transmitters, and a plurality of receivers. An individual transmitter and an individual receiver may be associated with each of the plurality of storage units. Each of the storage units may be located at a predetermined position relative to the individual receiver associated with the storage unit. The second signal from a receiver may be provided to a control panel that in response to the second signal identifies the storage unit experiencing the fire condition. The present invention is also directed at a fire suppression and indication system for use in an aircraft. The aircraft includes a cockpit, a control panel in the cockpit, and a storage area. The system includes a plurality of storage units located at predetermined positions in the storage area. a transmitter associated with each storage unit and configured to transmit a first signal upon detection of the fire condition, at least one receiver configured to detect the first signal and configured to provide a second signal indication detection of the fire condition, and a fire suppression device configured to discharge a fire suppressant material into the storage unit upon detection of the fire condition.

12 Claims, 17 Drawing Sheets

U.S. PATENT DOCUMENTS

| | | |
|---|---|---|
| 4,011,911 A | 3/1977 | Gow |
| 4,058,167 A * | 11/1977 | Granek et al. .................. 169/61 |
| 4,101,872 A * | 7/1978 | Pappas .................. 340/539.22 |
| 4,566,542 A * | 1/1986 | Enk et al. ...................... 169/62 |
| 4,597,451 A * | 7/1986 | Moore et al. .................. 169/16 |
| 4,646,848 A * | 3/1987 | Bruensicke .................. 169/62 |
| 4,987,958 A * | 1/1991 | Fierbaugh .................... 169/57 |
| 5,038,867 A * | 8/1991 | Hindrichs et al. ............. 169/62 |
| 5,059,953 A | 10/1991 | Parsons et al. |
| 5,113,945 A | 5/1992 | Cable |
| 5,540,402 A * | 7/1996 | Carducci .................. 244/118.1 |
| 5,880,867 A * | 3/1999 | Ronald ...................... 398/119 |
| 5,899,414 A * | 5/1999 | Duffoo ........................ 169/60 |
| 5,913,367 A | 6/1999 | Hampton |
| 6,003,608 A | 12/1999 | Cunningham ................ 169/46 |
| 6,032,745 A * | 3/2000 | Sears .......................... 169/29 |
| 6,104,301 A | 8/2000 | Golden |
| 6,491,254 B1 | 12/2002 | Walkinshaw et al. |
| 6,561,281 B1 | 5/2003 | Arnold |
| 6,601,653 B2 | 8/2003 | Grabow et al. |
| 6,676,081 B2 | 1/2004 | Grabow et al. |
| 6,739,400 B2 | 5/2004 | Lessi et al. |
| 2003/0230414 A1 | 12/2003 | Peltola et al. |
| 2004/0109415 A1 | 6/2004 | Zansky et al. |

* cited by examiner

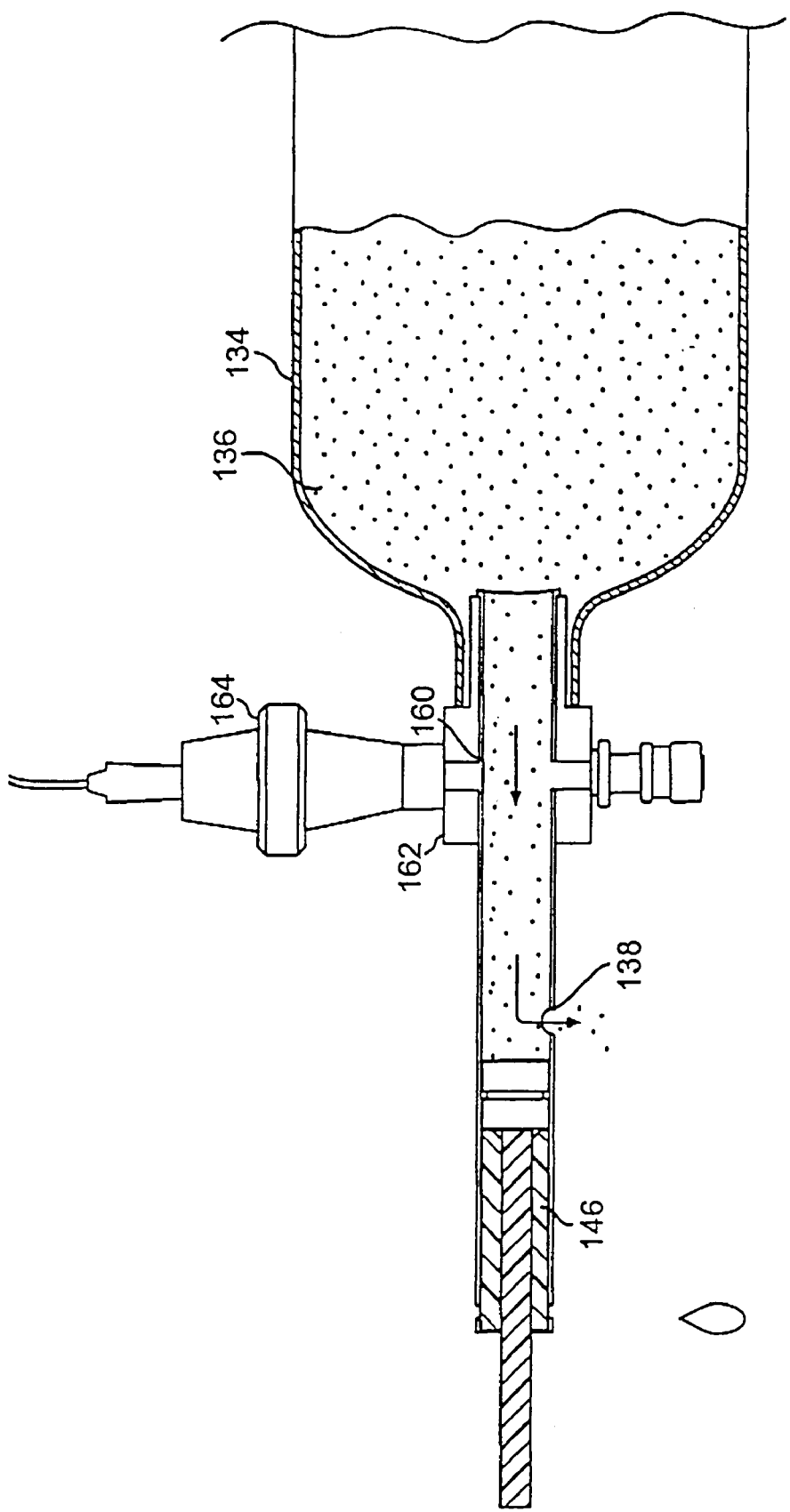

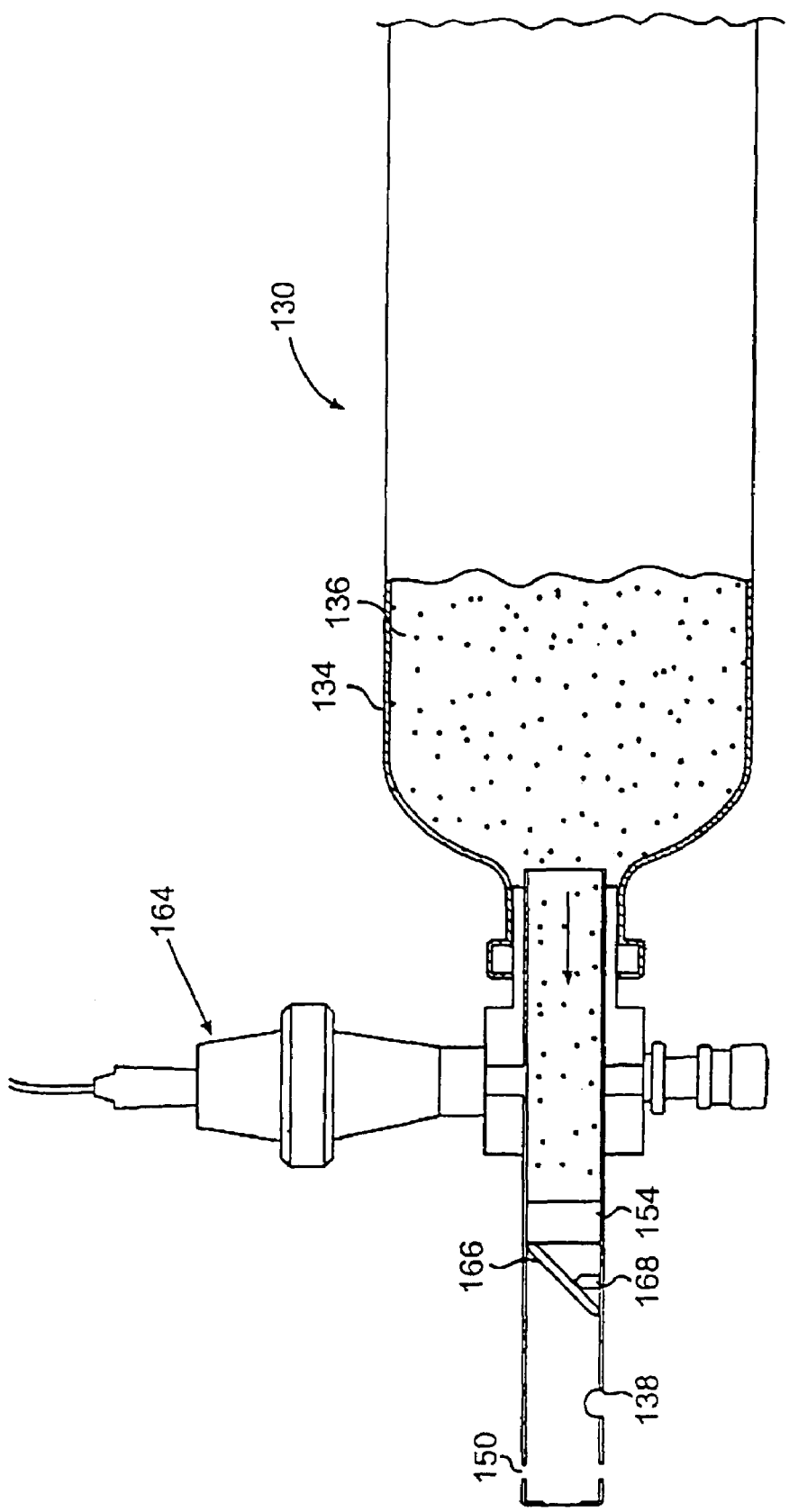

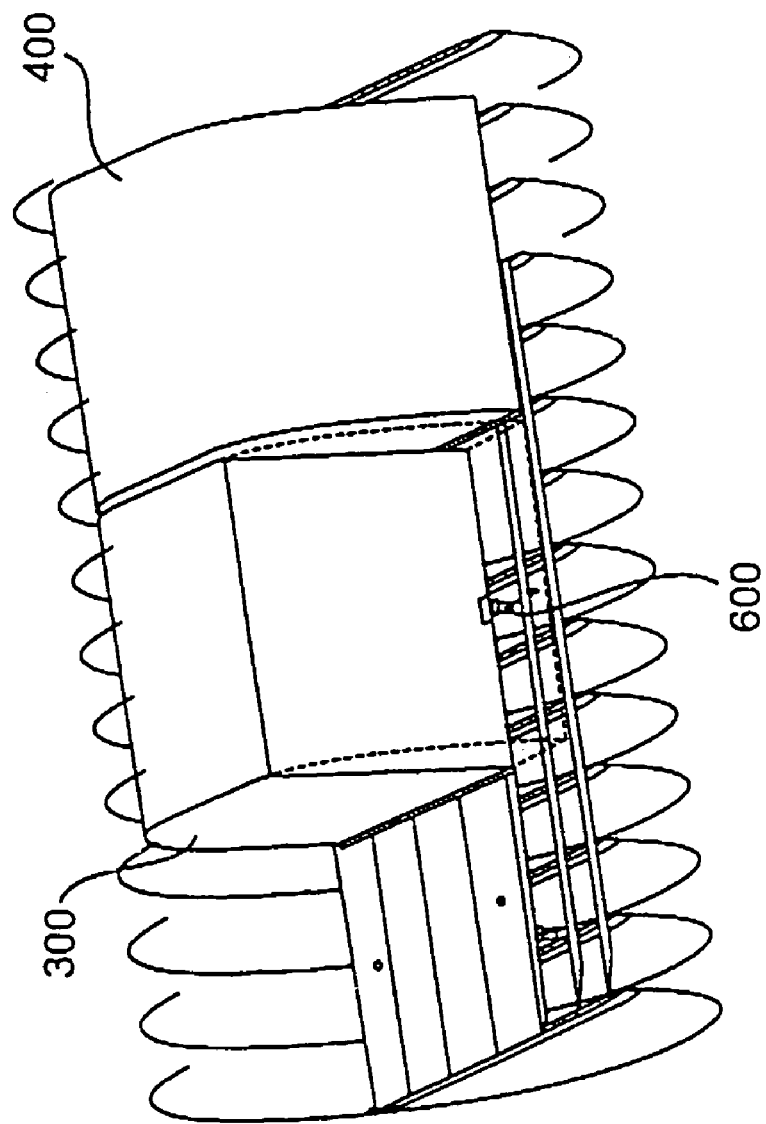

FIRE SUPPRESSION AND INDICATOR SYSTEM AND FIRE DETECTION DEVICE

This application claims the benefit of U.S. provisional application No. 60/198,319 filed Apr. 19, 2000, which is incorporated by reference.

DESCRIPTION OF THE INVENTION

1. Field of the Invention

The invention relates generally to a fire suppression and indication system, and more particularly to an automatic fire suppression and remote indication system for storage areas.

2. Background of the Invention

Every day, freight is shipped to its destination using one of several different modes of shipping including trucks, trailers, and aircraft. The freight is usually shipped inside storage areas and/or containers, and often the freight is consolidated within these areas and/or containers. Some of the freight can be composed of flammable material, which is highly combustible. These flammable materials pose a serious threat to the freight being transported, as well as the freight transporter. In addition, the freight may be stored at remote facilities and left unsupervised. The danger of fire is just as great in these remote areas as in the freight transporters.

Usually the freight is stored in an area separate from the person or operator handling the truck, trailer, aircraft, or separate from the personnel in charge of the storage facilities. For this reason, it is difficult for the operator to know when a fire has started in a storage area or container. In addition, there are usually several different containers located in one storage area, and it may not be clear which of the container's material is on fire. As a result, the fire can remain undetected for a prolonged period of time. If a fire were to remain undetected, other freight, the vehicle or aircraft, and any occupants including the operator may be in danger. Even if the fire was detected, the containers can act as barriers, preventing the operator from obtaining access to the necessary container.

It is much easier to put out a fire when it begins, than after it spreads to other flammable material. Normally, this is difficult to accomplish when the freight is shipped, because of the remoteness of the freight from the operator. One example of this situation is where the freight is shipped by aircraft.

The majority of main deck freight carried by modern commercial freighter aircraft is transported in containers or on pallets. These containers or pallets are generally referred generically as Unit Load Device or "ULD". They may be constructed of high-strength aircraft grade aluminum alloy, sometimes with sides constructed partially of Lexan. For safety, these ULD's must mate with the aircraft cargo system to restrain freight under various flight, ground load and emergency conditions. Therefore, under Federal Air Regulations, ULD's are considered aircraft appliances, are FAA certified for the specific type of aircraft and are typically manufactured to specifications contained in National Aerospace Standard (NAS) 3610. An example of a very commonly used industry ULD is the "SAA" designated container, which measures 88" wide×125" long with an arched roof 79" high. For pallets, two typical base dimensions are 88" and 96" wide, each 125" long, although other sizes are also available. Cargo loads are stacked and then netted to the pallet using cargo nets with fittings that engage seat track type rails around the pallet perimeter.

While aircraft are equipped with fire extinguishing bottles intended for manual crew operation, very few main deck containers and virtually no pallets are accessible to the flight crews during the flight.

As such, several containers or pallets may be stored in a cargo area of the aircraft. If one of the containers contains flammable material and the temperature rises too high or the material is otherwise ignited, a fire could start in the container and spread to other containers. Unless someone is in the cargo area at the time the freight combusts, which is unlikely, such a fire could remain undetected by the crew. If undetected, the fire could spread to other containers or areas and endanger the safety of the aircraft and crew.

Finally, this problem of detecting and suppressing fires is not limited to the freight shipping industry. It is a problem wherever freight or other articles or items are stored in a location that is remote from the owner and/or is not under direct supervision of the owner. In a broad variety of applications, it is desirable to detect and suppress a fire in the initial stages before it can grow out of control. Because of the need to rapidly load and unload the freight, it is also desirable that the system be transparent to the operation of the freight handlers, so that it requires no specific action or involvement by them.

It is accordingly an aspect of the invention to detect a fire or fire condition in a remote location, contain the fire or put it out, and warn the owner or operator of the fire and its status.

SUMMARY OF THE INVENTION

Accordingly, the present invention is directed at a system for detecting and suppressing a fire condition in a storage unit. Two approaches have been taken. One is container based, the other is aircraft based. The electronic portion which provides crew alerting and suppression activation is generally common to both. The system comprises a transmitter associated with the storage unit and configured to transmit a first signal upon detection of the fire condition, at least one receiver configured to detect the first signal and configured to provide a second signal indicating detection of the fire condition, and a fire suppression device configured to discharge a fire suppressant material into the storage unit upon detection of the fire condition.

In another aspect, there are a plurality of storage units, a plurality of transmitters, and a plurality of receivers. An individual transmitter and an individual receiver may be of the plurality of storage units.

In another aspect, each of the storage units is located at a predetermined position relative to the individual receiver associated with the storage unit. In a further aspect, the second signal from a receiver is provided to a control panel that in response to the second signal identifies the storage unit experiencing the fire condition.

In yet another aspect, the fire suppression device includes a source of pressurized fire suppressant material and a popup device disposed between one of the storage units and the source. The popup device is configured to apply the fire suppression material to the storage unit upon detection of the fire condition. In a further aspect, a storage unit is a container with a base including a hole. The popup device may include a valve aligned with the hole, such that the fire suppressant material is discharged into the container through the hole in the base. In another aspect, for the aircraft based system, the fire suppressant material or fire suppressant agent, is centrally located and distributed or manifolded to the storage units.

The present invention is also directed at a fire suppression and indication system for use in an aircraft. The present invention proposes two methods to deal with aircraft cargo fires. The first is a container based extinguishing system. The second is an aircraft based system. The aircraft includes a cockpit, a control panel in the cockpit, and a storage area. The system includes a plurality of storage units located at predetermined positions in the storage area, a transmitter associated with each storage unit and configured to transmit a first signal upon detection of the fire condition, at least one receiver configured to detect the first signal and configured to provide a second signal indication detection of the fire condition, and a fire suppression device configured to discharge a fire suppressant material into the storage unit upon detection of the fire condition.

In another aspect, the storage unit may be a pallet including a fire resistant blanket, and the fire suppression device may be arranged below the fire resistant blanket.

The present invention is also directed at a fire detection and suppression device comprising a pressurized vessel having an opening, a fire suppressant material contained within the vessel, a discharge tube having a first end connected to the opening of the vessel and a second end distal from the vessel, the tube having at least one aperture allowing discharge of the fire suppressant material, a seal arranged in the discharge tube between the aperture and the opening prior to discharging of the fire suppressant material, and a fire detection component arranged in the discharge tube. The fire detection component activates the discharge of the fire suppressant material upon detection of a fire condition.

In another aspect, the fire detection component includes a fuse plug disposed in the discharge tube, and a rod having a first end in contact with the fuse plug and second end in contact with the seal. When the fuse plug melts upon reaching a predetermined temperature, the rod and the seal are displaced. The discharge tube may be a hollow cylinder. In a further aspect, the present invention may include a guide located within the discharge tube such that the rod extends through the guide.

The fire detection and suppression device may be used in a fire suppression and indication system. For example, the fire detection and suppression device may be used in an aircraft.

Additional aspects of the invention will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 6A is prior to discharge and FIG. 6B is during discharge;

FIGS. 9A and 9B are cross-sectional views taken along the line IX-IX of FIG. 7, where FIG. 9A is prior to discharge and FIG. 9B is during discharge;

FIG. 10 is a cross-section of another embodiment of the fire detection and suppression device;

FIG. 13 is a perspective view of the floor system and storage units arranged in the cargo area of the aircraft;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. FIGS. 2, 4, 5, 6A, 6B, 7, 8, 9A, 9B, and 10 apply to a container based cargo fire suppression system as opposed to an aircraft based system. FIGS. 11, 12, 13, 14A, 14B, and 15 apply to an aircraft based system.

Figure 1:
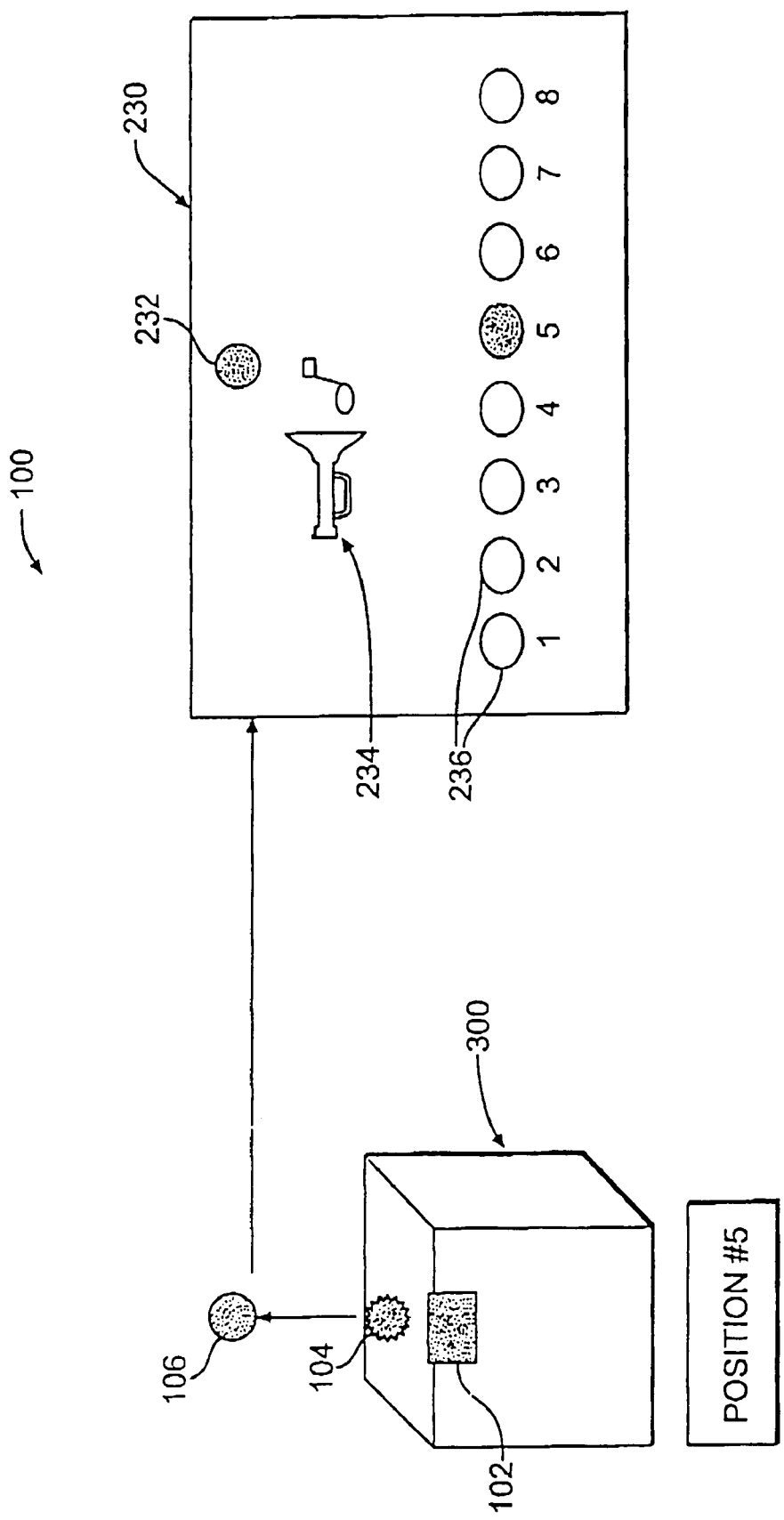
FIG. 1 is a schematic representation of a first embodiment of a fire suppression and indication system.

The overall arrangement of one embodiment of a fire suppression and indicator system 100 is shown in FIG. 1. The fire suppression and indicator system 100 includes a fire detection and suppression device 102, a transmitter 104, and a receiver or sensor 106. In a preferred embodiment, shown in FIGS. 1 and 2, the fire suppression and indicator system 100 is applied to detect and suppress fires in freight containers 300 or storage units transported by an aircraft 200. Storage units may also consist of pallets loaded with freight and covered with restrained fire retardant blankets.

In such a system, a plurality of freight containers 300 may be placed in the cargo or storage area 210 of the aircraft 200, and a fire suppression and detection device 102 and transmitter 104 may be placed within each of the containers 300. Adjacent each container 300 is located the receiver 106 that can communicate with the transmitter 104 in the given container, or receive a signal from the transmitter 104. When the fire detection and suppression device 102 detects a fire or fire condition and takes steps to suppress the fire or fire condition, the transmitter 104 sends a signal to the receiver 106. The receiver 106 detects this signal and sends a message that is received by the personnel operating the aircraft (or other transportation device).

In the illustrated embodiment, the container 300 includes a cover 310 with a hole 320. The fire detection and suppression device 102 and the transmitter 104 may be placed in or on the container or storage unit 300 in a manner that the fire detection and suppression device 102 can suppress a fire or fire condition in the container 300, and such that the transmitter 104 is located beneath the hole 320. The fire detection and suppression device 102 can be attached to the container using any standard fastening hardware. In one embodiment, the transmitter 104 emits an infrared (IR) signal through the hole 322 in the container to the receiver 106 outside the container. The receiver 106 may be positioned in general alignment with the hole 322 and the transmitter 104 so that it can detect when the transmitter 104 is activated. The aligned hole, transmitter, and receiver can be positioned in various locations with the container and aircraft.

Generally, the receiver 106 is located in the ceiling of the aircraft 200, although other locations will work just as well. In this embodiment, the receiver 106 is hard wired to a master fault panel or control panel 230 in the cockpit of the aircraft 200, although other means of transmitting the signal, such as radio signals, may work equally well. The master fault panel may contain separate channel processors for each container position, or a single processor able to handle several signals. For example, aircraft with twelve positions may require twelve processors. In this example, each processor may be wired to an individual position indicator light so only that light is activated by the signal sent from the received. In addition, aircraft that can hold three containers abreast at each position may still require twelve processors and may also require three receivers for each position.

When the receiver 106 receives a signal from the transmitter 104 in the container 300, the receiver 106 sends a signal to the master fault panel 230 as described above. The master fault panel 230 provides an alarm 234 and/or warning light 232, or similar indicator, thereby alerting the pilot that a fire or fire condition has been detected in the cargo area 210 of the aircraft 200. In addition, the location of the container may also be indicated on the control panel by a position indicator 236. For example, FIG. 1 shows a scenario where a fire has been detected in container 5 and the appropriate position indicator light 236 has been activated.

Figure 3:
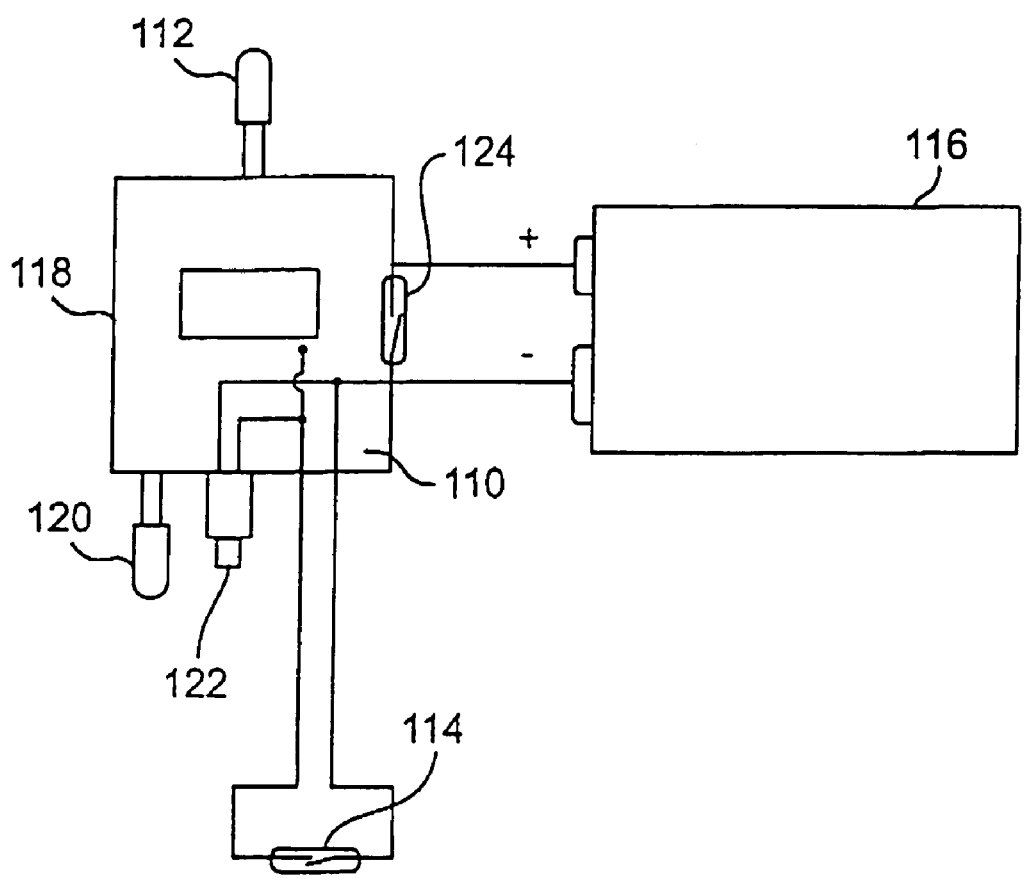
FIG. 3 is a schematic of the IR transmitter of the fire suppression and indication system of FIG. 1.

FIG. 3 shows schematically one possible arrangement of the transmitter 104. The transmitter 104 comprises a transmitter casing 108 (not shown in this view), a printed circuit 110, an IR diode 112, a first switch 114, and a power source 116. The IR diode 112 is illuminated when the first switch 114 is closed. The first switch 114 may be closed when the fire detection and suppression device 102 is activated. This process will be explained below. The power source 116 can be a battery, such as a lithium cell.

Optionally, the transmitter 104 can also include any of the following components: an oscillator/driver 118, a red light emitting diode (LED) 120, a test button 122, or a second switch 124. The second switch is shown in a series arrangement, but it could also be arranged in parallel to the first switch, if desired. The oscillator/driver 118 will allow the IR diode 112 to pulse at a predetermined frequency, such as 40 kHz, or multiplexed. If a continuous signal is desired, the oscillator/driver 118 can be eliminated. The LED 120 and test button 122 will allow personnel to verify that the circuit 110 is functioning properly. The second switch 124 will allow the transmitter 104, when configured to operate on two separate frequencies, to measure a different occurrence than the first switch 114. For example, the second switch 124 can be a bimetallic switch that operates independent from the first switch 114. In this arrangement, the first switch 114 may activate a signal indicating the discharge of the fire detection and suppression device 102, and the second switch 124 may activate a second signal when the temperature inside the container reaches a predetermined temperature. This information will inform the personnel whether a fire or fire condition was detected, and whether the fire or fire condition has been suppressed.

The receiver 106 may comprise an IR diode or IR transistor and an IR emitter. The IR emitter allows personnel to test the receiver at each position without activating the transmitter 104 in the container 300. Other receivers may be used that correspond to the type of transmitter 104 being used.

The fire suppression and indicator system 100 of the present invention can include a sensor to determine if the fire or fire condition has been suppressed in a container 300. For example, temperature sensor or smoke sensor can be used to determine whether the fire is suppressed and the signal from the sensor can be applied to a control device that deactivates the transmitter 104, if the fire is suppressed. Alternatively, the second switch 124 can be used to deactivate the signal when the fire or fire condition has been eliminated. When the receiver 106 stops receiving a signal from the transmitter 104, it deactivates the fire signal to the master fault panel 230. This change would indicate that the fire or fire condition had been eliminated. In other alternatives, the master fault panel 220 can have a separate indicator to advise the pilot, or user, that the fire has been successfully suppressed. The second sensor in the container can also be used to advise the pilot of a dangerous condition where a fire is not successfully suppressed.

In certain preferred embodiments, the fire detection and suppression device 102 for a given container (or area) may be a unitary device of relatively simple and inexpensive design. Exemplary embodiments of such devices are illustrated in FIGS. 4-10. Generally, the fire detection and suppression device 102 includes a fire bottle 130, a discharge tube 132, and a fire detection component or system 133 arranged in said discharge tube 132. The fire bottle 130 is a relatively simple pressurized vessel 134 having a mouth or opening 135, and the fire suppression material or extinguishing agent 136 in the bottle 130 is applied to the container 300 through a discharge port 138 in the discharge tube 132. The fire detection component includes a thermal plug 148, a rod 152, and a seal 154, all of which will be described below. In some embodiments the transmitter 106 is fixed to the discharge tube 132.

Figure 4:
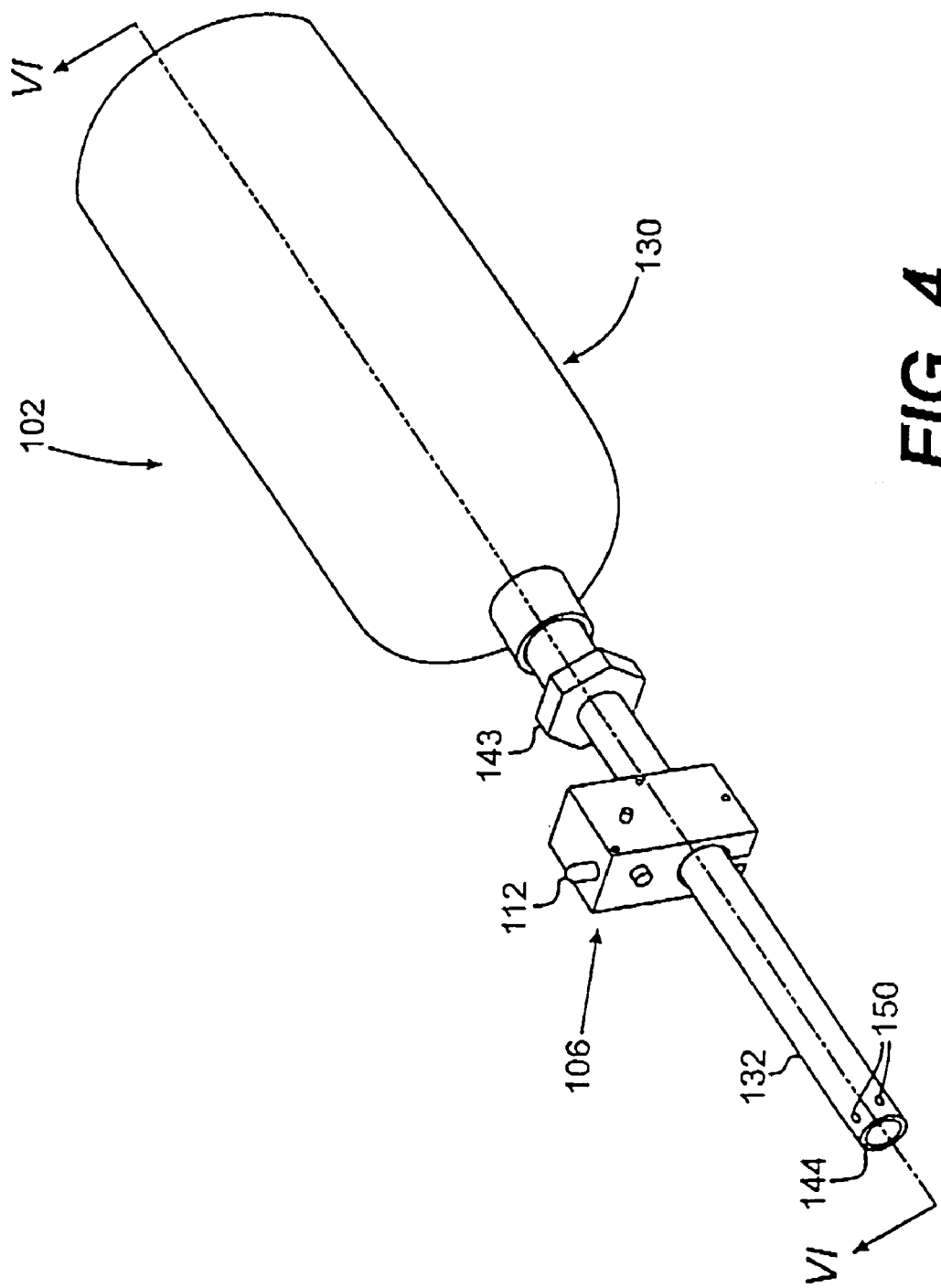
FIG. 4 is one embodiment of the fire detection and suppression device of FIG. 1.
Figure 5:
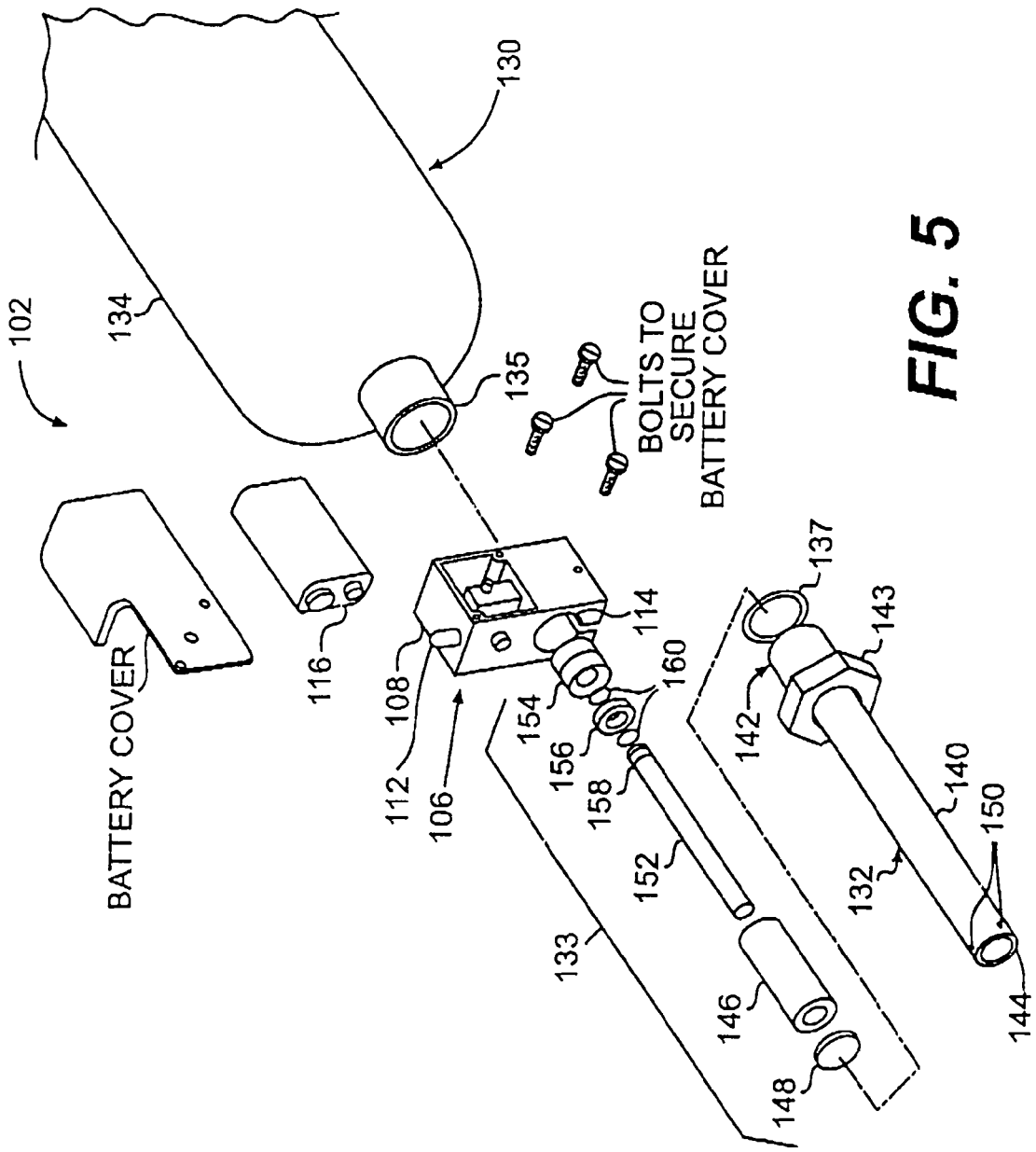
FIG. 5 is an exploded perspective view of the device and transmitter of FIG. 4.
Figure 6:
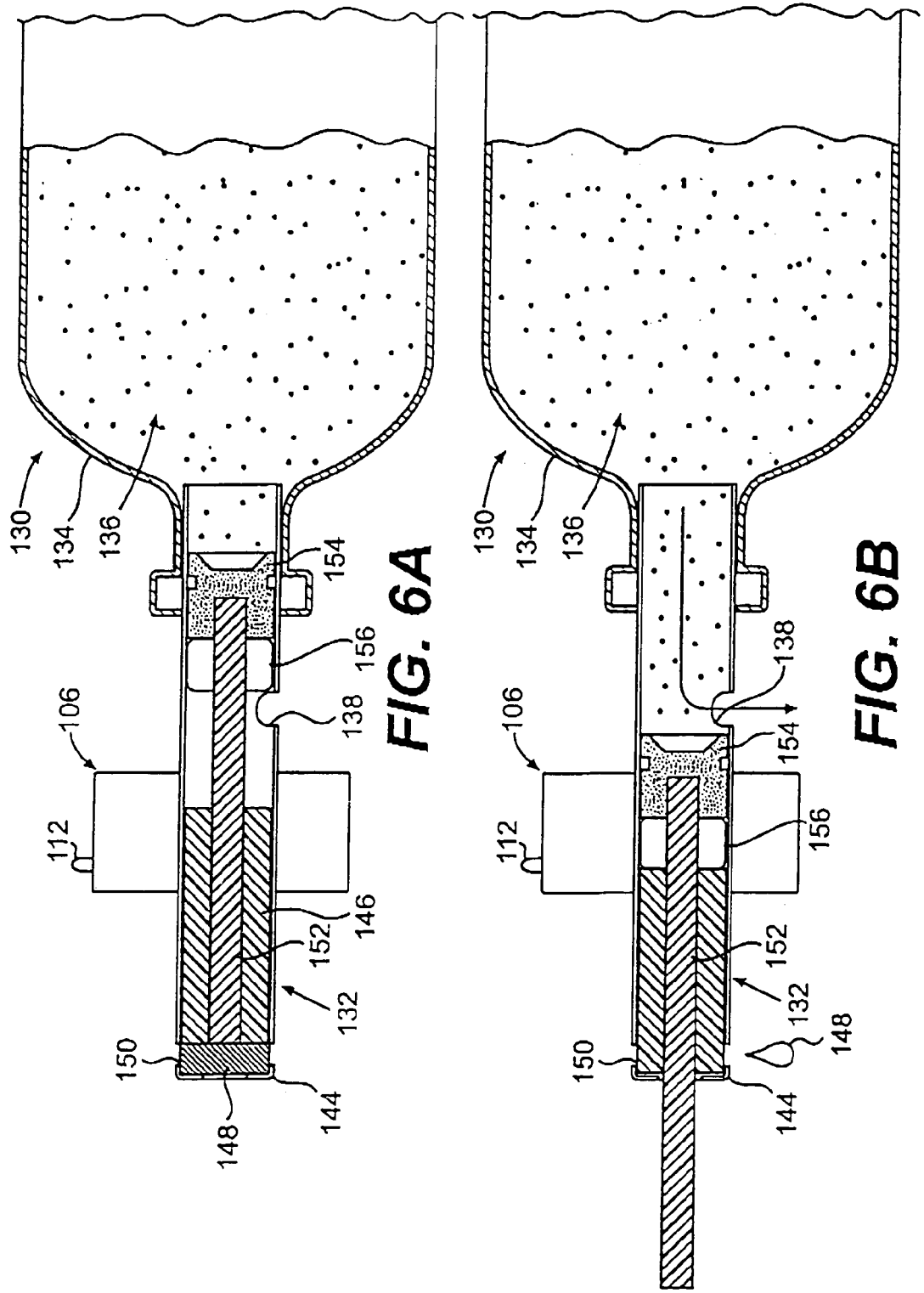
FIGS. 6A and 6B are cross-sectional views taken along the line VI-VI of FIG. 4, where

In one preferred embodiment, as seen in FIG. 4-6, the discharge tube 132 is a hollow cylinder 140 with an open end 142 proximal to the fire bottle 130 and a partially closed end at the distal end 144 of the cylinder 140. The open end 142 is pressed, glued, or otherwise attached to an aluminum fitting 143, which is screwed into the mouth or opening 135 of the pressurized vessel 134. An o-ring 137 assists in completing a seal between the aluminum fitting 143 and the mouth 135. The discharge port 138 is located in the hollow cylinder 140 at a predetermined distance from the fire bottle 130.

A hollow cylindrical guide 146, which may be six inches long depending on the size of the hollow cylinder 140, is disposed at the distal end 144 of the cylinder 140. The hollow guide 146 and hollow cylinder 140 are preferably made from a material that does not rapidly conduct thermal energy.

A thermal fuse plug 148 may be located between the distal end 142 of the hollow cylinder 140 and the guide 146. Alternatively, the fuse plug 148 may be inside the guide 146. In this preferred embodiment, the fuse plug 148 is designed to melt at a predetermined temperature.

The hollow cylinder 140 includes several bores 150 located circumferentially about the distal end 142 of the cylinder 140. These bores 150 allow heated air to enter the hollow cylinder 140 and assist in heating the fuse plug 148. In this arrangement, the fuse plug 148 is largely thermally disconnected from the fire bottle 130 and discharge tube 132. The effective heat sink of the bottle 130 and its contents therefore do not delay the melting of the fuse plug 148, allowing the fuse plug to reach its melting point quicker than waiting for the entire fire detection and suppression device 102 to reach the same temperature. Variations of the fire bottle 130 and the fire suppression material 136 will be discussed below.

Figure 2:
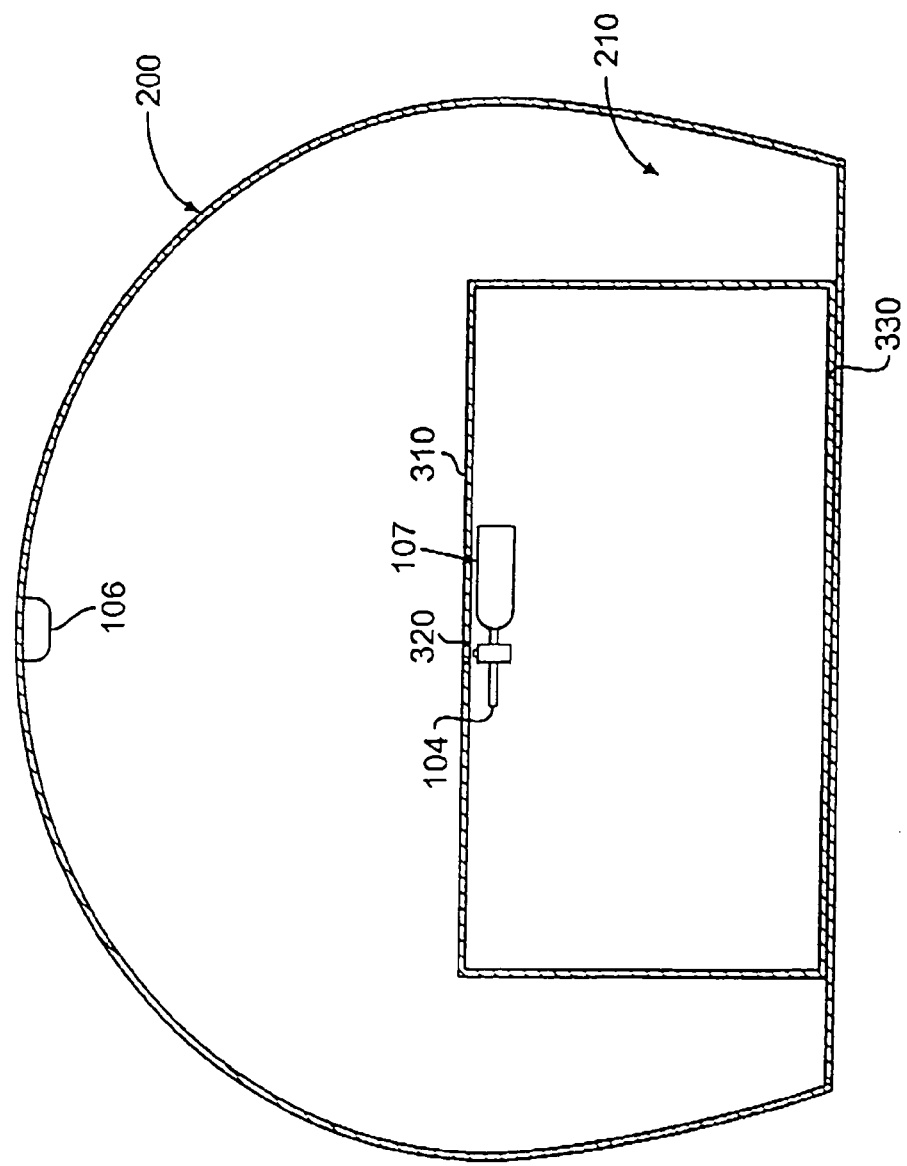
FIG. 2 is one possible arrangement of the fire suppression and indication system of FIG. 1 in an aircraft.

Arranged on the outside of the discharge tube 132 is the transmitter 106. The transmitter 106 includes the transmitter casing 108, which protects the circuit 110. The first switch 114 as seen in FIGS. 2 and 3 is a magnetic reed switch. If desirable, the second switch 124 can be included in this arrangement. The placement of the transmitter 106 on the discharge tube 132 allows the fire suppression and indicator system 100 to be immediately responsive to a change of condition, e.g. temperature, which indicates a fire has begun or a fire condition is present.

As seen in FIG. 6A, inside the discharge tube 132, a rod 152 is pressed between the fuse plug 148 and a seal 154. The seal 154 is located at or near the mouth 135 of the fire bottle 130 and is under pressure by the fire suppressant material 136 in the pressure vessel 134. As long as the fuse plug 148 does not melt, the rod 152 will hold the seal 154 in place, thereby preventing emptying of the fire bottle 130. A magnet 156 is located at the proximal end 158 of the rod 152, for example, by a retaining ring 160 on each side of the magnet 156. The magnet 156 activates the magnetic reed switch 114 when the magnet moves beneath the transmitter 106, as described below.

Once the fire detection and suppression device 102 is installed in the container 300, the fire detection and suppression device 102 remains stable until the internal temperature of the container 300 reaches a predetermined temperature. This predetermined temperature would be the temperature at which a fire or fire condition may occur. This predetermined temperature is also limited to the melting point of the fuse plug 148. Thus, the predetermined temperature can be varied by selecting a fuse plug that has a corresponding melting point.

Because the fuse plug 148 is directly open to the surrounding environment, the fuse plug reacts to the temperature of the surrounding environment very rapidly. If the fuse plug 148 reaches the melting point, the fuse plug will melt and the retaining force on the rod 152 is removed. The internal pressure of the fire bottle 130 will push the seal 154 out of the mouth 135 of the pressurized vessel 134, moving the rod down the discharge tube 132, through the guide 146. The guide 146 prevents the rod 154 from binding in the discharge tube 132 and also limits the travel of the rod and seal 156. As the seal 156 moves down the discharge tube 132, the fire suppression material 136 is emptied into the container through the discharge port 138. This arrangement is shown in FIG. 6B.

In addition, as the rod 152 moves down the discharge tube 132, the magnet 156 moves with the rod. The magnet 156 is positioned under the magnetic reed switch 114 such that the magnet's 156 movement cause the magnetic reed switch 114 to close, completing the circuit 110 in the transmitter 104. The transmitter 104 sends an IR signal out of the container 300, which is detected by the receiver 106 located above the container 300. A second signal is generated and transmitted by the receiver 106 to the master fault panel 230. The signal can contain valuable information, including the location of the container 300. The receiver 106 may be hard wired directly to the master fault panel 230, or it can also be in the form of a separate transmitter and receiver, such as a radio transmitter, to send the second signal to the master fault panel 230.

In an alternative embodiment, the transmitter can be configured to transmit a radio signal instead of the IR signal. An appropriate receiver 106 could then be used in place of the IR receiver 106.

Figure 7:
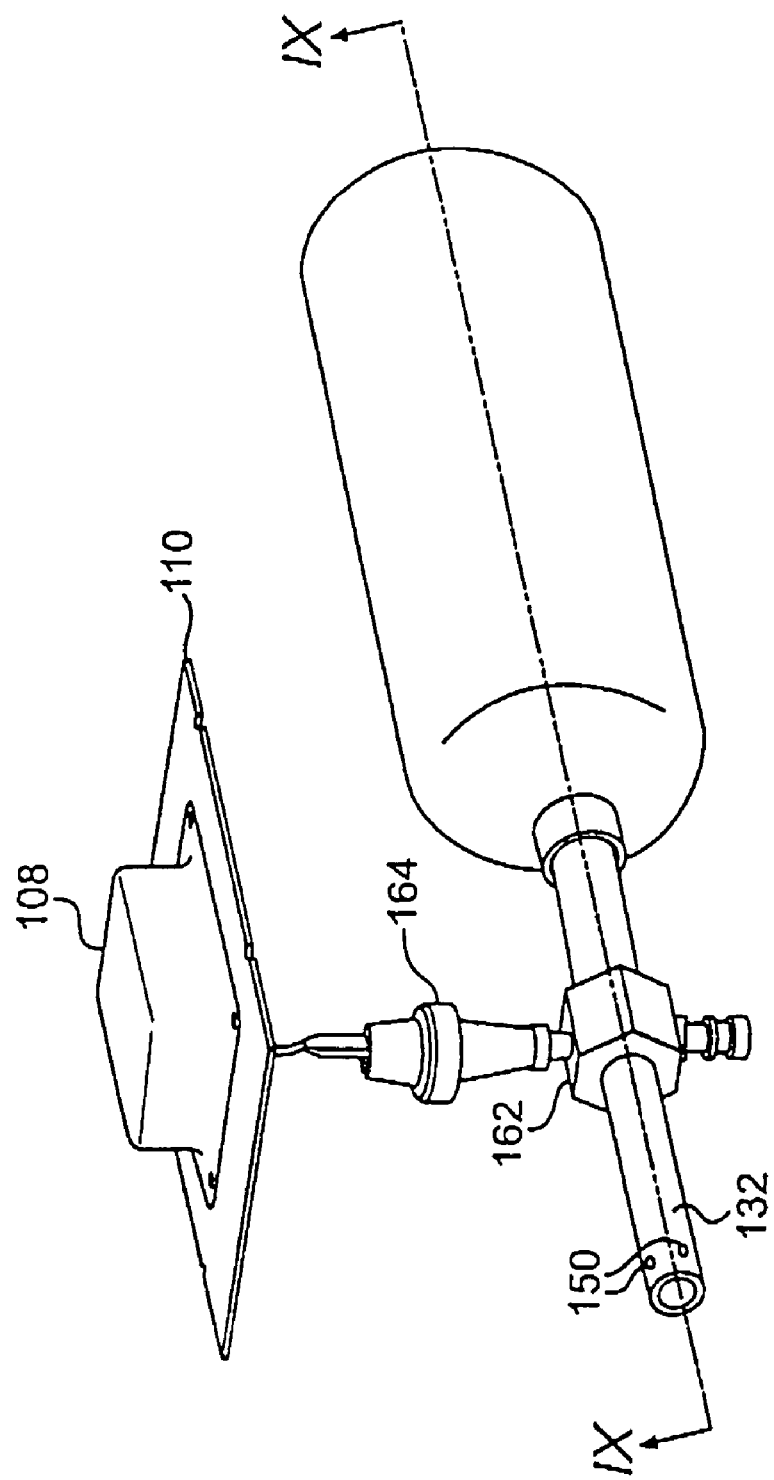
FIG. 7 is another embodiment of the fire detection and suppression device.
Figure 8:
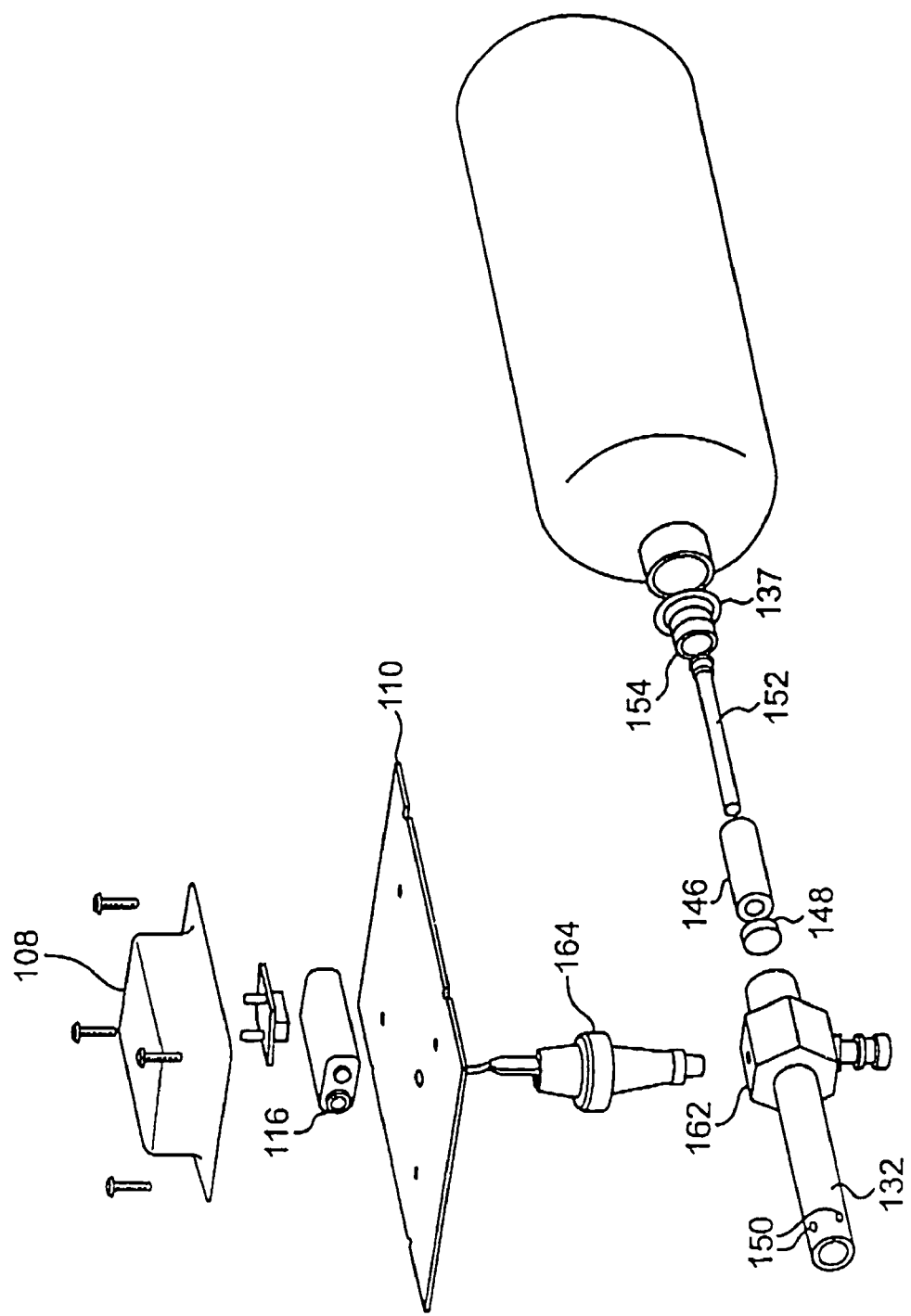
FIG. 8 is an exploded perspective view of the device and transmitter of FIG. 7.

Another embodiment of the fire detection and suppression device 102 for the fire suppression and indication system 100 is seen in FIGS. 7-9. In this embodiment, the hollow cylinder 140 of the discharge tube 132 has a tap hole 160. The arrangement of the fuse plug 148, guide 146, and rod 152 is the same as described above. The seal 154 for the fire bottle 130 is arranged in the hollow cylinder 140, such that the seal is between the distal end 144 of the hollow cylinder and the tap hole 160. A fitting 162 is placed over the tap hole 160, and a pressure sensor 164 is attached to the fitting. The pressure sensor 164 includes a pressure switch, which is the first switch 114 of the transmitter 104. The pressure switch 114 remains open when the fire bottle 130 is maintained at a predetermined pressure. As described, this system detects changes in pressure as opposed to changes in location of a magnet to detect activation of the fire detection and suppression device. This embodiment can also use the pressure sensor 164 to detect a leak in the fire bottle and a loss of fire suppression material 136. The pressure sensor 164 is positioned so that it can directly measure the pressure in the fire bottle 130, as well as pressure changes in the fire bottle. If pressure drops to a predetermined setting, the transmitter 104 can advise the operator that the fire detection and suppression device 102 has been activated in response to a fire, or that a leak has occurred.

Figure 9A:
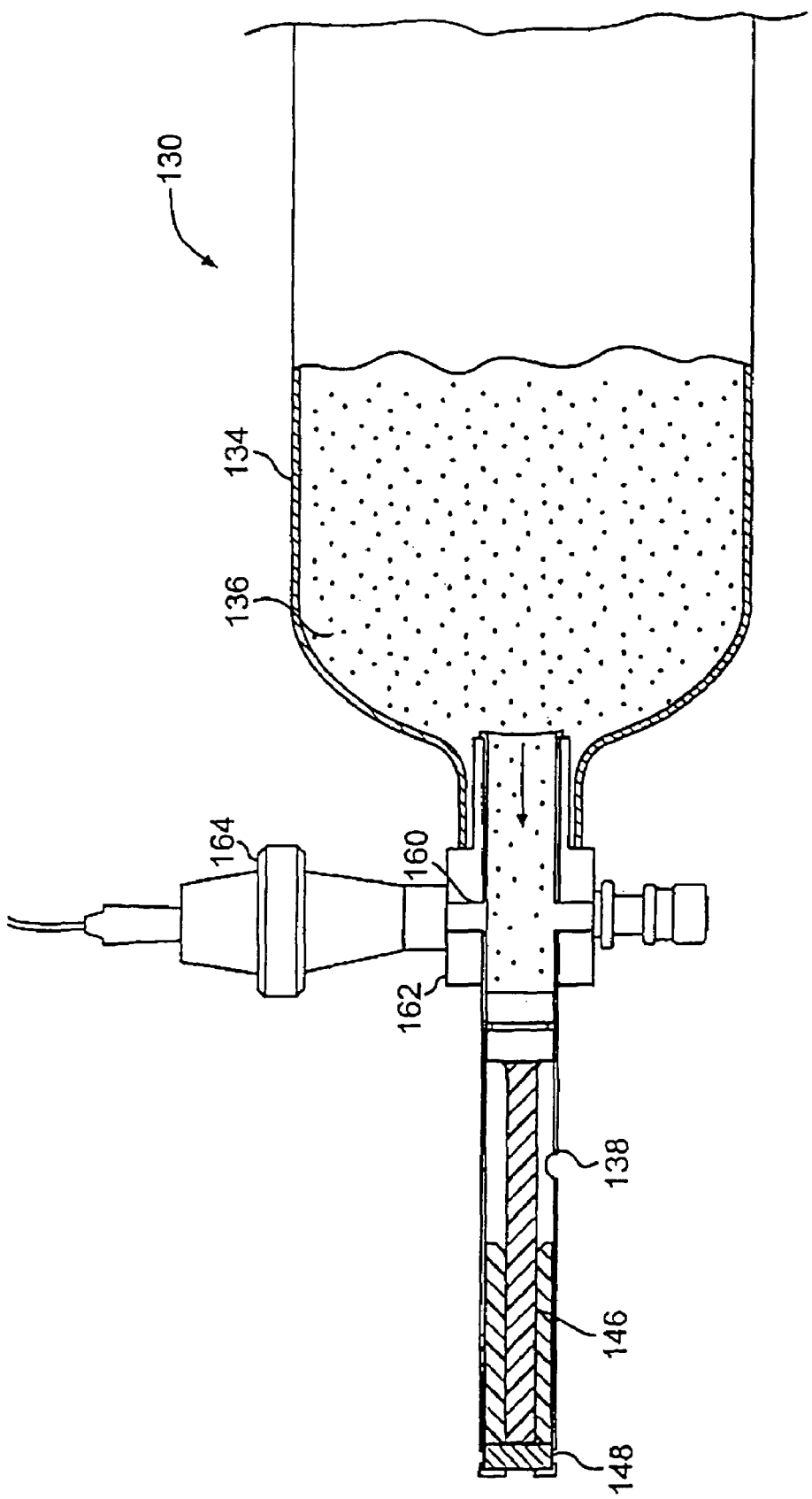

For example, as seen in FIGS. 9A and 9B, during a fire or fire condition, the fuse plug 148 will melt and the rod 152 will move down the discharge tube 132 past the discharge port 138. This allows the fire suppressant material 136 of the fire bottle 130 to be released, and also changes the pressure in the discharge tube 132. The switch 114 in the circuit 110 closes and activates the transmitter 104. The transmitter 104 sends a signal to the receiver 106 located above the transmitter, which in turn alerts the personnel in the cockpit 220.

The fire detection device component 133 of the second embodiment can be replaced by an off-the-shelf design used in sprinkler heads, as seen in FIG. 10. The off-the-shelf design typically includes a lever 166 supported by a fulcrum 168. One end of the lever 166 is pressed against the seal 154, while the other end of the lever 166 is pressed against an internal surface of the hollow cylinder 140. The fulcrum 168 supports the lever 166 in this arrangement, such that the seal 154 presses against the one end of the lever 166, thereby forcing the other end against the internal surface. The fulcrum 168 may be thermally disconnected from the hollow cylinder 140. The fulcrum material is selected based upon a melting point matching the predetermined temperature.

Once the fulcrum 168 melts, the lever 166 is no longer forced against the internal surface, allowing the seal 154 to be forced down the discharge tube 132 past the discharge port 138. The transmitter 104 will be activated as described in the pressure sensor arrangement or can be separated from the fire detection and suppression device as described below.

In another embodiment, the transmitter 104 may be separated from the fire detection and suppression device 102. In this arrangement, the first switch 114 of the transmitter 104 can be eliminated, and only the second switch 124, preferably a bimetallic switch, will be used. In this embodiment, the fire detection and suppression device 102 can be eliminated as well. During a fire or fire condition, the bimetallic switch 124 will remain open until the switch reaches the predetermined temperature. Once the switch 124 reaches the predetermined temperature, the switch will close and activate the transmitter 104. After receiving the signal from the transmitter 104, the receiver 106 will send a signal to the master fault panel 230 alerting the personnel to the fire or fire condition. If the fire detection and suppression device 102 were included, the device could be activated separately, using one of the described devices above.

FIGS. 11-16 show a second embodiment of the fire suppression and indicator system 100 arranged in an aircraft 200. This fire suppression and indicator system 100 may include a transmitter 104, which can be used with containers 300 as well as pallets 400, a receiver 106, a control unit 500, and a popup device 600.

Figure 11:
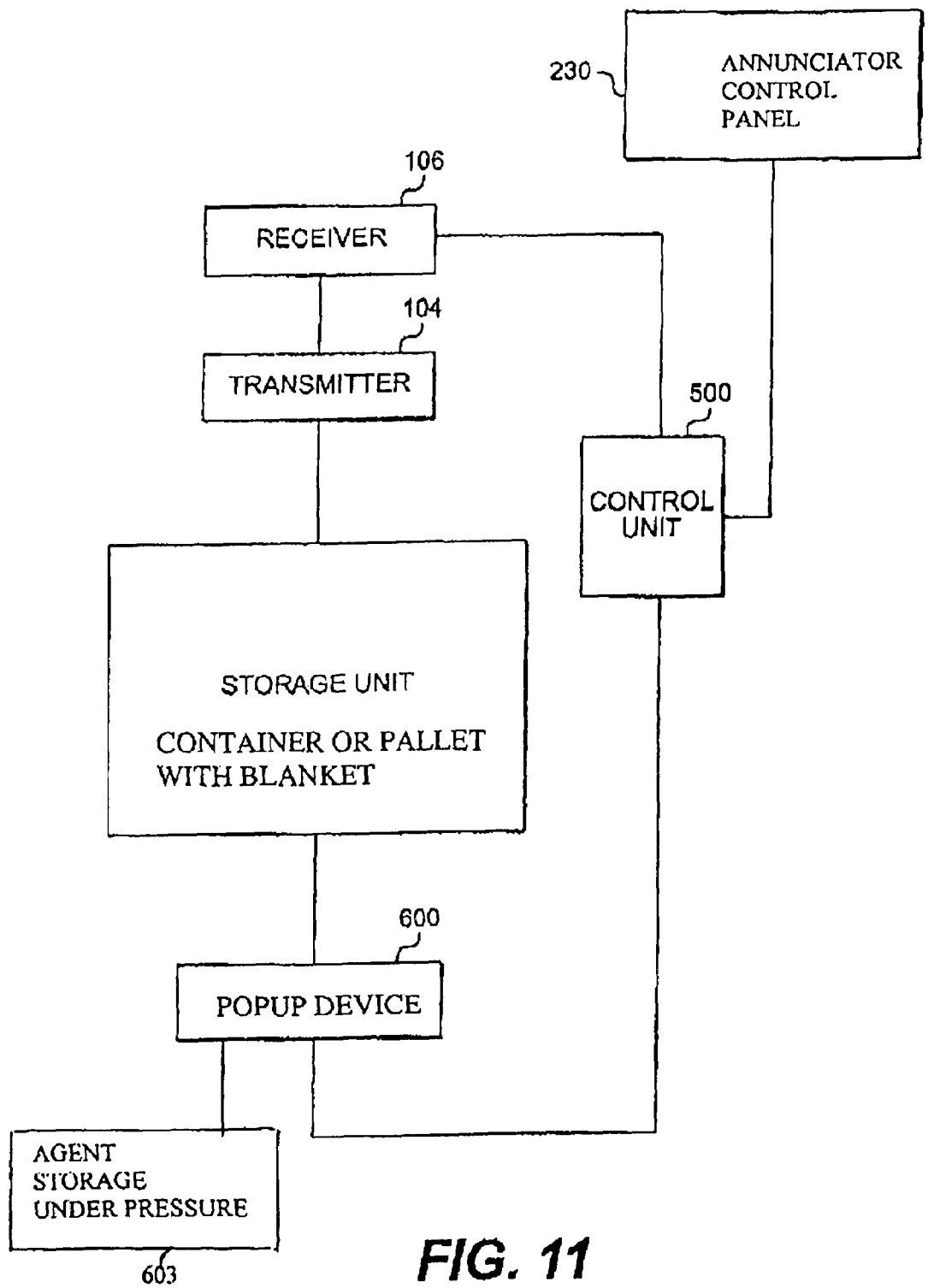
FIG. 11 is a second embodiment of the fire suppression and indication system of the present invention.

A schematic of the system is shown in FIG. 11, where the transmitter 104 may be placed in thermal communication with a storage unit to detect a change in temperature above a predetermined level (a fire condition). The transmitter 104 would include a sensor for sensing temperature or some other parameter (such as the presence of smoke or airborne particulates) that indicates a fire condition. When a fire condition is sensed, the transmitter may send a signal to a receiver associated with the particular storage unit, where the storage unit may be a container 300. The transmitter also may send a signal to a receiver in the general vicinity of the storage container, where the storage unit is a pallet 400. The receiver may include an additional transmitter to send a second signal to a control unit 500. The receiver can also be hard wired to the control unit 500. Preferably, the second signal would indicate the type and identity of the storage unit where the transmitter was activated. For example, if the second signal originated from a pallet, the controller may send a third signal to the control panel alerting the crew to a fire condition or fire in the particular pallet. Similarly, if the second signal originated from a container, the control unit may also send a signal to the control panel indicating a fire or fire condition in the particular container. In addition, the control unit, or the transmitter 104, or the receiver 106, can be designed to send a signal to a popup device 600 configured to open and permit fire suppressant material into the storage unit where the fire is detected. Preferably, the popup device is positioned in a recessed cavity below the storage unit and extends upward to engage the bottom of the storage unit, when a fire condition is detected. Each of the signals may be provided using an infrared signal, using a radio signal, or using a hardwire connection.

Figure 16:
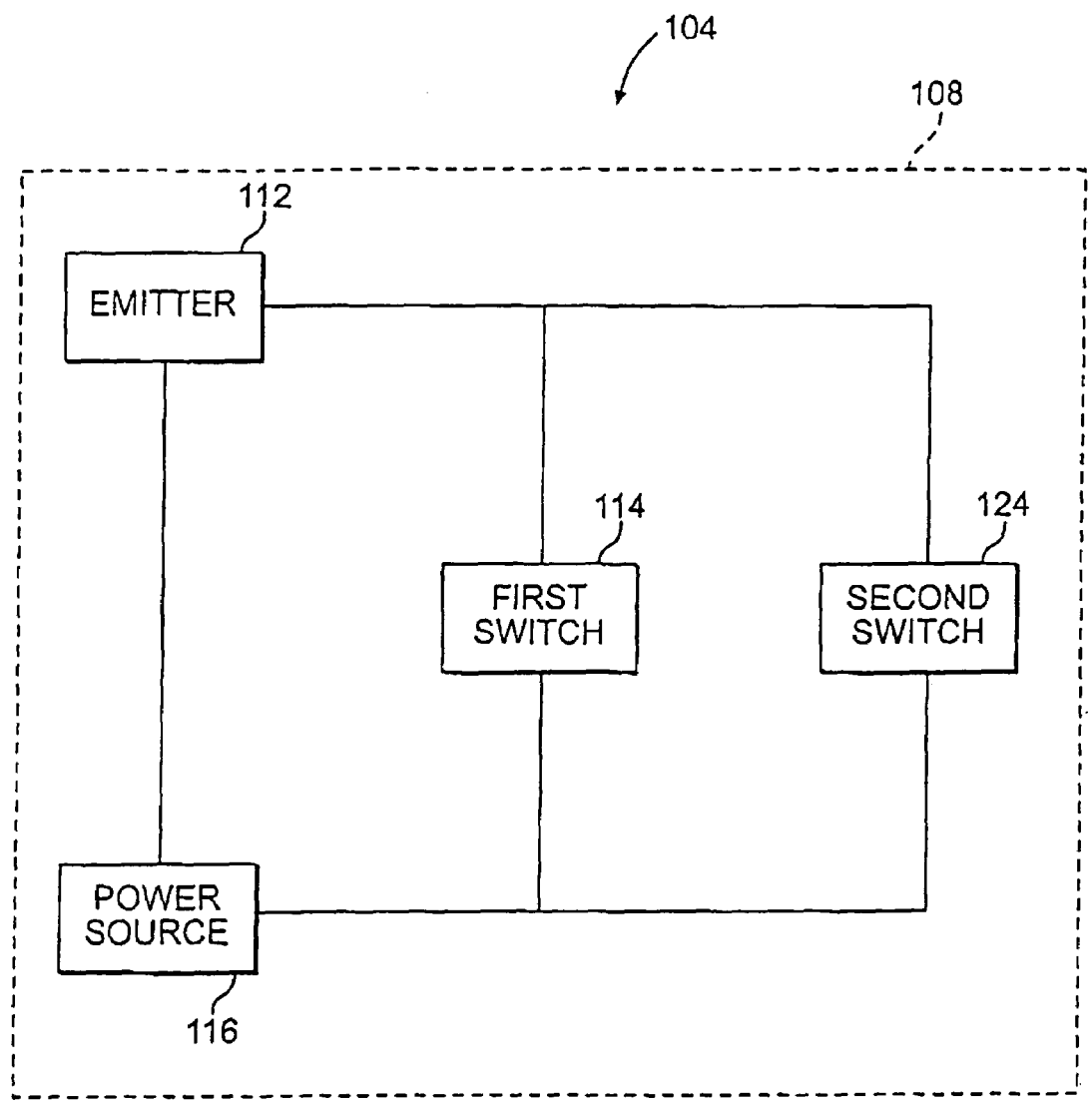
FIG. 16 is a schematic of the transmitter for the second embodiment of FIG. 11.

In the second embodiment, the transmitter 104, as seen in FIG. 16, may include a first switch 114 coupled to a two channel (Channel 1 and Channel 2) infrared emitter 112. The transmitter 104 is equipped with a power source 116, such as a long life battery, and cast in a monolithic block 108. The transmitter may also include a second switch 124 wired in parallel to the first switch 114 to allow for testing of the transmitter 104. In a preferred embodiment, the first switch 114 is a bimetallic switch in the form of a bimetallic probe and the second switch 124 is a magnetic reed switch. The magnetic reed switch 124 is included for simple testing of the transmitter 104 with a magnet.

The monolithic block 108 may be a low profile block of impact resistant acrylic plastic or other similar material. To minimize damage to the transmitter, the sides may be sloped in pyramid fashion, but cropped flat across the top. The transmitter may be installed onto a container by using some type of adhesive or with conventional fasteners. Installation onto a pallet may be accomplished by sewing it into a pouch in the top surface of a fire resistant blanket 410. The blanket 410 is positioned over a loaded pallet and fixed to the pallet, in a conventional fashion. The bimetallic probe 114 may be located on the bottom of the block 108. The probe 114 may contact or extend through a surface of the storage unit. For a container 300, the surface may be the cover 310 of the container. For a pallet 400, the surface may be the fire resistant blanket 410.

Figure 12:
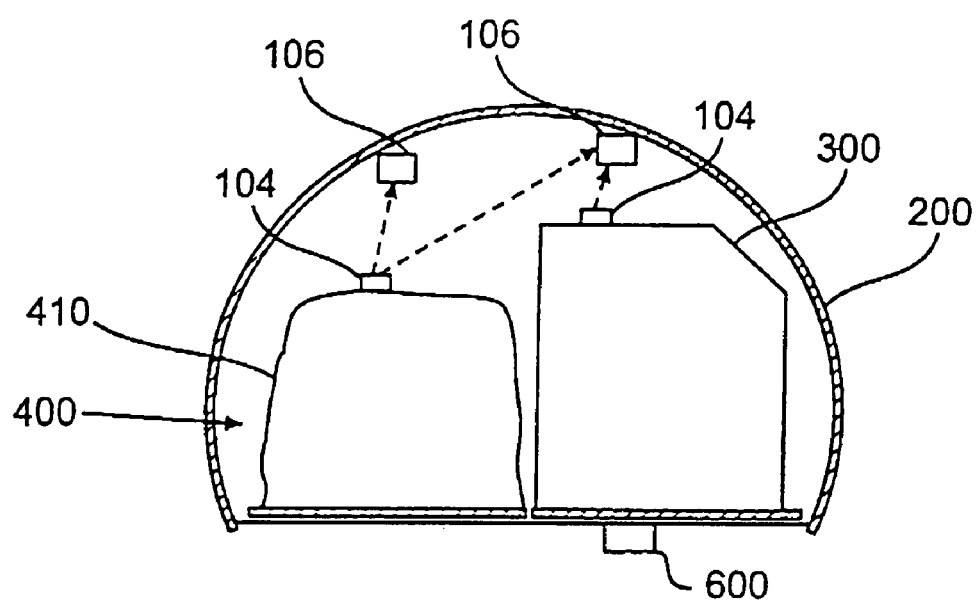
FIG. 12 is a schematic of the fire suppression and indication system.

As seen in FIG. 12, the transmitter 104 may be installed in the cover 310 of a container 300 or sewn into a fire resistant blanket 410 to be used to cover palletized freight. This blanket 410 may also serve as a fire suppressant material retention device. When installed on a container 300 the transmitter can be narrowly focused and adjusted so that the receiver 106 located overhead in the aircraft will only "see" the container 300 directly below it. When installed on a pallet 400, the signal from the transmitter may be adjusted so that it may trigger any receiver 106 in its field of view. The transmitter 104 installed on containers can use a different channel or made of transmissions than those installed on pallets. In a preferred embodiment, the receiver 106 may be installed directly over each storage unit position in the cargo area 210.

The transmitter may be identical for either pallet or container installation, in which a third switch may be provided to switch between channel 1 for pallet installations and channel 2 for container installations. Alternatively, the transmitter may be configured to transmit on either channel 1 or channel 2.

The control unit 500 may provide three different functions. First the control unit 500 may be designed to actuate a popup device 600 under any container 300 or pallet 400 whenever a fire is indicated in that specific position. The popup device 600 is activated by the transmitter 104 and the receiver 106, working in conjunction with each other. As an alternative, the popup device 600 can be activated by the transmitter 104 or the receiver 106, when either of these devices transmits a signal or signals. Second, the control unit 500 incorporates two channels which may be used to notify the flight crew that a container 300 is indicating a fire, if the channel signal activated is a channel 2 signal. Third, the control unit 500 may be used to notify the flight crew that a pallet 400 is experiencing a fire, if the signal channel activated is a channel 1 signal. The flight crew can be notified by using the control and annunciator panel 230 as described above for the first embodiment.

Figure 14A:
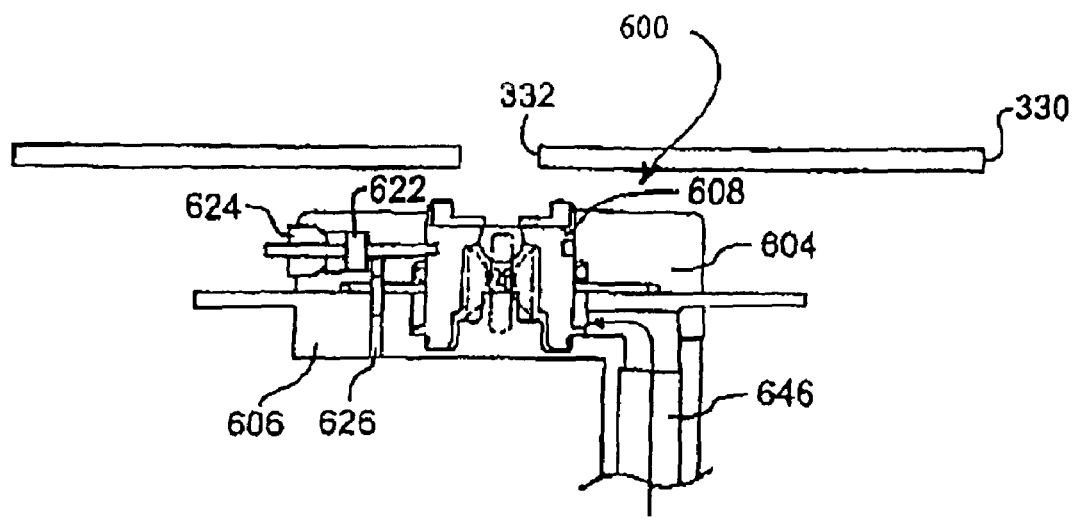
FIGS. 14A and 14B are cross-sectional views of a pop-up valve in the fire suppression and indication system of FIG. 11, where 14A is prior to discharge and 14B is during discharge.
Figure 14B:
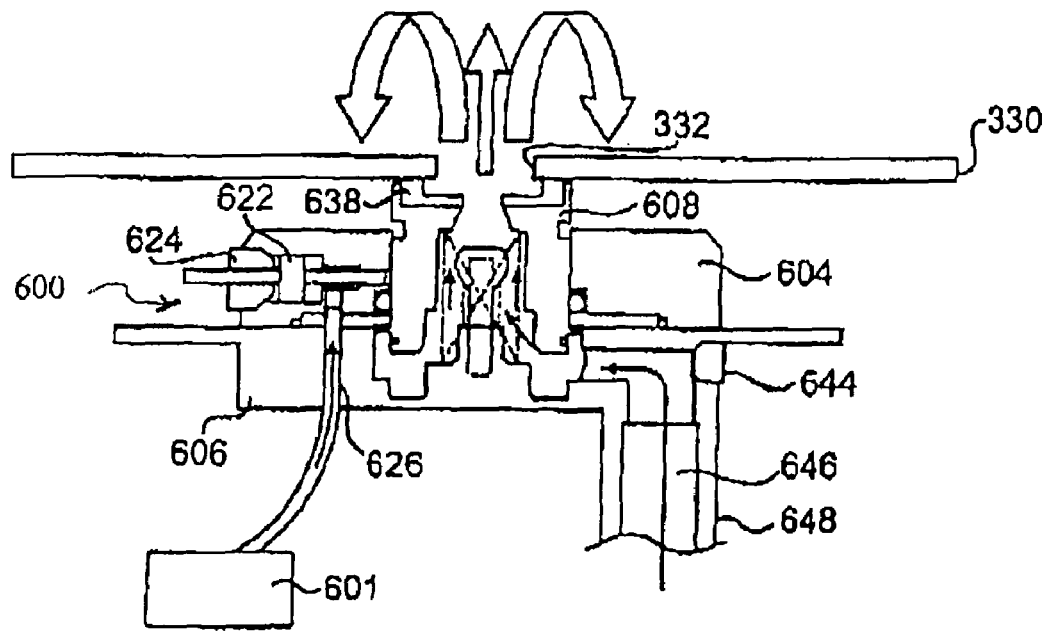

In one embodiment, as shown in FIG. 14B, the popup device 600 will include an activation mechanism 601. The activation mechanism 601 may be either a solenoid or gas generating device, such as a squib, either activated by an electrical impulse. Upon receipt of an activation signal (impulse), the activation mechanism 601 retracts, allowing the piston 608 of the popup device 600 to extend. This opens a path to allow the fire suppressant material (agent) to flow from the pressurized agent storage container 603 throughout the distribution system (manifold) into the storage unit (container). A popup device 600 will be provided at every container or pallet position throughout the aircraft. Generally, the popup device 600 is floor mounted, as shown in FIG. 13, because the containers and pallets typically engage an aircraft floor mounted restraint system, which prevents significant movement of the storage units. The restraint system helps provide fixed locations on the base of each storage unit at which the fire suppressant material may be introduced. Each popup device 600 preferably is located in a recess under the floor and is positioned at a location that will be aligned with an opening in the container 300, so that when the popup device 600 opens, fire suppression material flows through the popup device. When the popup device 600 is in the retracted portion, the storage unit can be readily moved along the floor.

In one embodiment, the popup device 600 includes a popup valve or popup device and piston 608 and an actuator plunger 622. The popup device 600 may serve two purposes. First, it may couple the aircraft fire suppression system to the container base, and second, it acts as a valve to port fire suppressant material to the container. Since the on-board supply of fire suppressant material is limited due to weight and space constraints, it is necessary to port the fire suppressant material only to the specific container that has indicated a problem. For this reason, the popup devices 600 will be individually actuated. A variety of different popup seal mechanisms can be used. One example is described below.

The popup device 600 has two positions as seen in FIGS. 14A and 14B. FIG. 14A shows the popup device 600 in the normally closed or retracted position. The fire suppressant material path is closed off and the popup piston 608 is retracted. The piston 608 is held in the retracted position by an actuator plunger 622. In the stowed position the popup device 600 acts as a closed valve.

FIG. 14B depicts the popup device 600 in the extended position in response to an alerting signal. The actuator plunger 622 has released the piston 608, which is driven to the extended position by a spring 612. The piston 608 with its upper seal 638 now bears against the container base 330, covering the hole 332 provided in the base. The fire suppressant material path is now open to allow the fire suppressant material to flow though the popup device 600 through the hole 332 in the base 330 and into the container 300. This arrangement permits application of additional fire suppressant material should a fire subsequently re-ignite and again trigger the transmitter 104.

Figure 15:
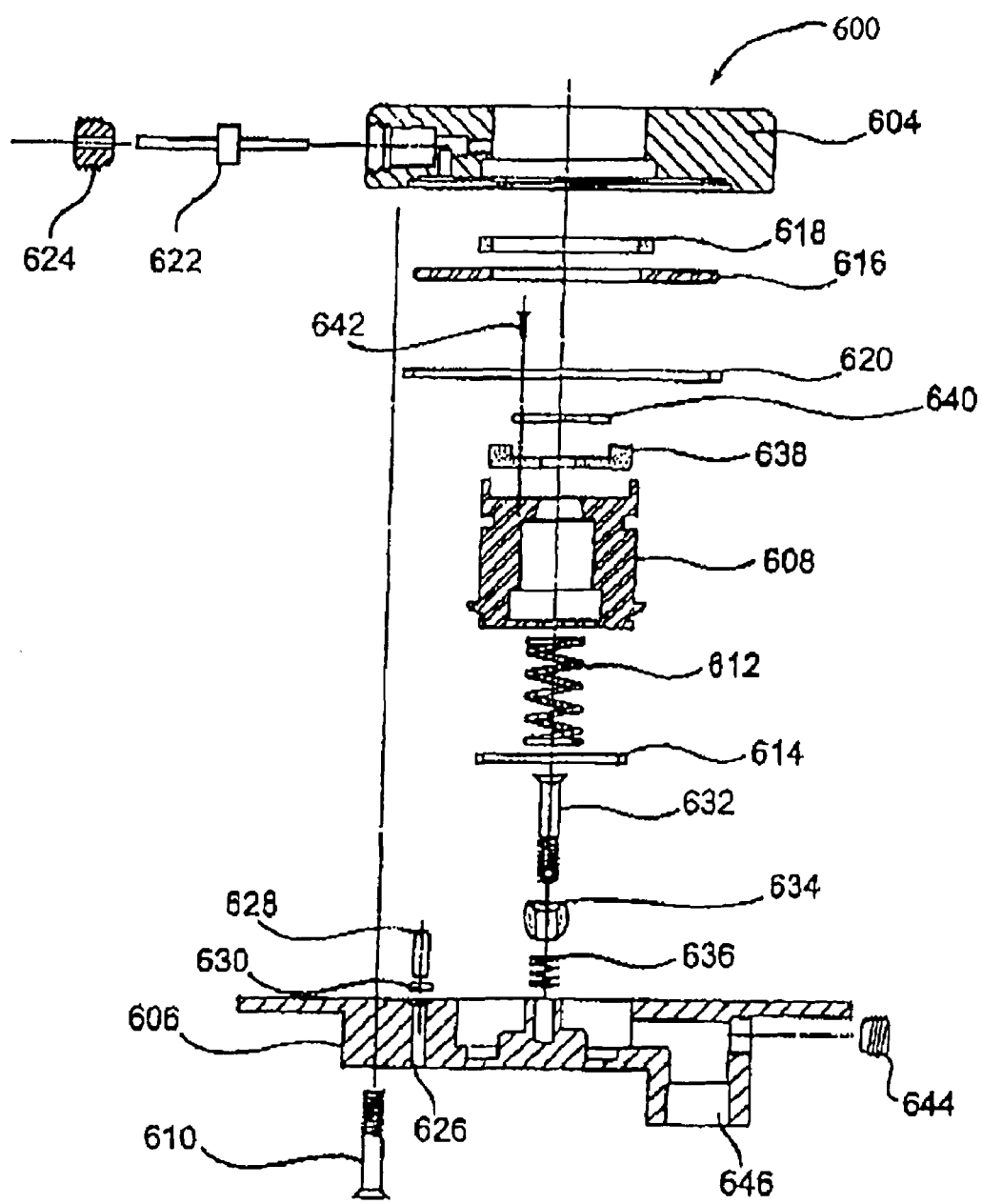
FIG. 15. is a exploded view of the pop-up valve of FIG. 11.

As seen in FIG. 15, the pop device 600 includes three main parts, an upper body 604, a lower body 606, and a popup piston 608. The body parts may be held together by four equally spaced countersunk bolts or other fasteners 610. Once assembled, the lift spring 612 exerts a force on the piston 608 and causes the popup device to extend when released. An "O" ring seal 614 is provided at the bottom of the piston 608 to provide a substantially gas tight seal when the piston 608 is in the retracted position. The spacer/retainer 616 prevents the piston 608 from moving past an uppermost limit in the extended position and retains and positions the "O" rings 618 and 620. The piston 608 is held in the retracted position by the actuator plunger 622 which is retained by the actuator plunger-retaining plug 624. The actuator gas path 626 to the backside of the actuator plunger 622 is sealed across the split line of the upper body 604 and lower body 606 by a seal tube 628 and an "O" ring seal 630. When the popup device 600 is in the retracted position, the top of the popup device 600 is sealed from outside contamination by a post seal screw 632, a bead seal 634 and a bead lift spring 636. The face of the piston 608, which contacts the base 330 of the container 300, is sealed through the use of an upper seal or contact seal 638. This seal 638 is retained in a counterbore by a retainer 640 and three retaining screws 642. A safety release plug 644 may be provided in the fire suppressant material flow path 646.

The actuator plunger 622 may be activated by a burst of pressurized gas from the pressurized agent storage container 603. This burst may be triggered when the alerting transmitter 104 signals its receiver 106 which, in turn, signals the control unit 500. Once triggered the agent storage container 603 and distribution system (manifold in the aircraft) supplies pressurized gas to activate the actuator plunger 622. A drawback to this system is that two lines from the agent pressure storage container 603 would be required, one to supply gas to activate the plunger 622 and another to provide extinguishing agent to the popup device 600 and thence to the storage container 300. Alternatively, an electrical solenoid or electrically fired gas generating device (squib) could be used to activate the plunger.

The popup device 600 may be connected directly to the source of fire suppressant agent 603 through a hose 648 and a distribution system, such as a manifold having one or more connection ports. Each port may be connected to a separate popup device 600. In this scenario, the agent supply 603 would be manually coupled to the manifold using commercially available quick disconnect fittings. This would allow a crewmember to disconnect and connect another agent supply container 603 should the first one be insufficient to suppress a container fire. Alternatively, the agent pressure storage container 603 could be remotely fired by a crewmember in the cockpit using an electrical circuit and squib device.

In operation, a significant temperature increase, such as from a fire in a container 300 or under the blanket 410 on a pallet 400, will close the bimetallic switch 114 in the transmitter. This will send a signal to the receiver 106 located overhead in the aircraft. When excited by a signal from a transmitter 104, the receiver 106 will transmit an electrical signal to the control unit 500, which consists of an amplifier and multi-channel relay. The control unit 500 determines which channel has been triggered. If it received a signal from a Channel 1 source (i.e., a pallet) it sends a signal to a control panel 230 in the cockpit where it announces that a thermal event has taken place in a pallet 400. If the control unit receives a signal from a Channel 2 source (i.e., a container), it sends a pulse to the activation device 601 associated with the popup device 600, located underneath the involved container 300. This signal causes the popup device 600 to extend and press against the base 330 of the container 300. This seals the popup device 600 to the bottom of the container base 330, in which hole 332 has been provided to allow fire suppressant material to disperse into the container 300. Then, the desired preselected charge of fire suppressant material is released into the container.

The crew can monitor the status of the fire or fire condition and respond accordingly. For example, if the fire continues, one of the crew can replace and activate another agent storage container 603 to supply additional fire suppressant material to the container.

The fire detection and suppression system may respond differently when a fire is detected in a pallet, because pallets pose an unusual fire problem. Since pallets are frequently exchanged during the course of business between commercial airfreight operators who own them, modifications to the pallets, such as holes in their bases, to accept a floor mounted extinguishing system may not be permissible. However, fire suppressant materials are commercially available in thermally activated canisters or sticks. While these are generally regarded as somewhat less effective than Halon (the standard military and commercial aviation extinguishing agent), they could easily be included with the freight during the buildup of the pallet 400 or could be incorporated into the design of a blanket 410. The transmitter and receiver operate as described above; however, the control unit would only send a signal to the cockpit alerting the crew to the fire occurrence and not activate the popup device 600 installed in that position.

In yet another embodiment, a fire suppressant device can be incorporated under a blanket and be actuated by a radio signal from the transmitter, receiver, or control unit.

The system may also indicate to the flight crew that the fire or fire condition has been suppressed. Upon cooling, the bimetallic thermal switch 114 opens, thereby turning off the transmitter 104. The receiver 106, in turn will stop transmitting a signal to the control unit 500. The control unit may be configured to transmit a signal to the flight crew that the fire or fire condition has been suppressed, or the control unit may simply turn off the alerting signal to the control panel. This will allow the flight crew to monitor the occurrence of a fire or fire condition from inception to suppression and to act accordingly.

For a container based system, the fire suppression material 136 can be one of several materials including HALON 1211, a HALON replacement, or dry chemical. Suitable HALON replacements include HFC-23, HFC-125, HFC-134a, HFC-227ea, HFC-236fa, FC-3.1.10, FC-5.1.14, and IFC-1311. Suitable dry chemicals include ammonium polyphosphate, a temperature reducing agent, and potassium carbonate/bicarbonate, a carbon dioxide liberator. The pressurized vessel 134 can be designed for a single discharge of the fire suppression material 136 or be reusable for multiple discharges. The pressurized vessel 134 can be formed from stamped steel, spun aluminum, cold-headed aluminum, or any suitable polymer material.

As is evident to those skilled in the art, the present invention can be used in a variety of environments where fire or fire conditions need to be detected and suppressed. The invention is relatively economical to make and apply, and it can be modified to fit different situations. For example, although IR devices are applied in the above embodiments, other transmitters and receivers can be used. For example, a micro radio could be used as a transmitter that could send an "activated" signal to a radio receiver proximate the container. The radio transmitter could in turn send signals directly to the master fault control panel, either through a wired connection or through radio transmitters. The system can also be modified to utilize microcomputers or designed electronic chips to provide the control and/or sensor functions disclosed. Similarly, other detection sensors can be used to activate the unit in the container and/or detect when it is activated.

The fire suppression and indicator systems have been described in relation to use in an aircraft; however, the system can be used in most situations where the storage area is not under direct supervision. For example, the system could be installed in a truck and trailer arrangement. In addition, the invention can be used in a remote storage location where the control panel is connected to a phone system. Therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fire suppression and indication system for use in an aircraft, the aircraft having a cockpit, a control panel in the cockpit, and a storage area, the system comprising:
    a plurality of storage units for storing freight, the storage units being located at predetermined positions in the storage area, the storage units comprising at least one of a container and a pallet;
    a transmitter associated with each storage unit and configured to transmit a first signal upon detection of a fire condition, the first signal being an infrared signal;
    at least one receiver configured to detect the first signal and configured to provide a second signal indicating detection of the fire condition; and
    a fire suppression device configured to discharge a fire suppressant material into the storage unit upon detection of the fire condition.

2. A system according to claim 1, wherein the fire suppression device includes a source of pressurized fire suppressant material and an application mechanism associated with one of the predetermined positions, the application mechanism being arranged between one of the storage units and the source and configured to apply the fire suppression device to the storage unit upon detection of the fire condition.

3. A system according to claim 2, wherein at least one of the storage unit is a container with a base including a hole, and the application mechanism includes a valve aligned with the hole, such that the fire suppressant material is discharged into the container through the hole in the base.

4. A system according to claim 3, wherein the valve is in a retracted position prior to detection of the fire condition, and the valve is configured to engage the base of the container upon detection of the fire condition.

5. A system according to claim 4, wherein the application mechanism includes a piston to move the valve into contact with the base.

6. A system according to claim 1, wherein at least one of the storage units is a pallet including a fire resistant blanket, and wherein the fire suppression device is arranged below the fire resistant blanket.

7. A system according to claim 1, further comprising a control unit configured to receive the second signal, wherein the control unit is configured to determine the origin of the first signal based on the second signal.

8. A system according to claim 7, wherein the control unit transmits a third signal to a control panel indicating the origin of the first signal.

9. A system according to claim 8, wherein the control unit transmits a fourth signal to the fire suppression device to discharge the fire suppressant material into the storage unit.

10. A fire suppression and indication system for use in an aircraft, the aircraft having a cockpit, a control panel in the cockpit, and a storage area, the system comprising:
    a plurality of containers in the storage area, wherein each container includes a base and a cover having an opening;
    a fire suppression device located inside each of the containers, the fire suppression device comprising
        a vessel;
        a fire suppressant material inside the vessel;
        a discharge tube attached to the vessel;
        a fire detection system that detects a fire condition and activates the discharge of fire suppression material through the discharge tube; and
        a transmitter that emits a first signal through the opening when the fire detection system releases the fire suppressant material; and
    a receiver configured to be positioned within the storage area and external to the containers,
    wherein the receiver is configured to detect the first signal and send a second signal to the control panel in the cockpit of the aircraft.

11. A system according to claim 10, wherein the receiver is configured to be located above a corresponding one of the containers.

12. An aircraft comprising:
    a cockpit;
    a control panel located in the cockpit;
    a storage area; and
    the fire suppression and indication system of claim 10.

* * * * *

UNITED STATES PATENT AND TRADEMARK OFFICE
CERTIFICATE OF CORRECTION

| | | |
|---|---|---|
| PATENT NO. | : 7,456,750 B2 | Page 1 of 1 |
| APPLICATION NO. | : 09/837228 | |
| DATED | : November 25, 2008 | |
| INVENTOR(S) | : James B. Popp and Arthur J. Benjamin | |

It is certified that error appears in the above-identified patent and that said Letters Patent is hereby corrected as shown below:

On the title page, item (57), line 22, "area. a" should read --area, a--.

In claim 3, column 14, line 9, "unit" should read --units--.

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,456,750 B2  Page 1 of 1
APPLICATION NO. : 09/837228
DATED : November 25, 2008
INVENTOR(S) : Popp et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (169) days Delete the phrase "by 169 days" and insert -- by 272 days --

Signed and Sealed this

Tenth Day of November, 2009

David J. Kappos
*Director of the United States Patent and Trademark Office*